United States Patent [19]

Srivastava

[11] Patent Number: 4,507,682
[45] Date of Patent: Mar. 26, 1985

[54] SELF-GATED AGC DETECTOR

[75] Inventor: Gopal K. Srivastava, Buffalo Grove, Ill.

[73] Assignee: Zenith Electronics Corporation, Glenview, Ill.

[21] Appl. No.: 441,124

[22] Filed: Nov. 12, 1982

[51] Int. Cl.³ .............................................. H04N 5/52
[52] U.S. Cl. ..................................... 358/178; 358/174
[58] Field of Search .............. 358/174, 178, 176, 177; 455/234, 246; 375/98

[56] References Cited

U.S. PATENT DOCUMENTS

| 3,439,115 | 4/1969 | Pollack | 358/178 |
| 3,441,669 | 4/1969 | Janson et al. | 358/178 |
| 4,218,708 | 8/1980 | Harford | 358/178 |

Primary Examiner—Michael A. Masinick
Assistant Examiner—Michael D. Parker

[57] ABSTRACT

An AGC gate signal generating circuit for a television receiver comprises a series RC circuit having a time constant for developing a charging current at a relatively slow rate in relation to a horizontal scanning line of a video signal and at a relatively fast rate in relation to a field of the video signal. The AGC gate signal is developed at the collector of a transistor whose base is coupled for receiving the video signal and whose emitter is coupled to the node formed between the resistor and capacitor of the RC circuit. The transistor is responsive to a nomimal level video signal for assuming a non-conductive state during horizontal scanning lines for charging the capacitor to a level below the video black level and for assuming a conductive state during horizontal sync intervals for discharging the capacitor to produce the collector current AGC gate signal. The transistor further assumes a conductive state for producing the AGC gate signal in response to a number of horizontal scanning lines of a reduced level video signal substantially less than a full field.

7 Claims, 4 Drawing Figures

SELF-GATED AGC DETECTOR

BACKGROUND OF THE INVENTION

The present invention relates generally to AGC circuits for television receivers and particularly concerns an AGC gate signal generating circuit for use with a gated AGC detector.

Gated AGC systems for television receivers typically include an AGC detector which is gated for sampling the horizontal sync tip levels of a received video signal. The sampled video level is normally stored on a capacitor and coupled therefrom for adjusting the gain of the RF and IF amplifiers of the receiver to maintain the detected video signal at a substantially constant level.

Early gated AGC systems employed the horizontal flyback pulses developed in the receiver as the gating signal. These systems have the disadvantage that when the receiver is initially turned on phase coincidence between the flyback pulses and the horizontal sync pulses is not always immediately established. As a result, the AGC detector is not gated for sampling the horizontal sync tip level as desired but rather is gated some time during the horizontal scanning interval such that the video signal itself is sampled leading to the development of an incorrect AGC voltage across the storage capacitor.

More recent gated AGC systems have overcome the foregoing problem by ANDing the flyback pulses with the horizontal sync pulses to form the gating signal. However, when a reduced level video signal is received, due to airplane flutter or other interference, the horizontal sync pulses may decrease below their detection level so that no gating signal is produced resulting in a so-called "lockout" of the AGC system. To minimize the effects of AGC lockout, anti-lockout circuits have been developed which sense a shift in the level of the horizontal sync pulses for producing a DC voltage representing the receipt of a weak sync signal. This DC voltage is then processed with the flyback pulses to produce the gate signal for allowing operation of the AGC system. While such circuits provide acceptable performance, they are quite complex and relatively expensive to manufacture.

It is therefore a basic object of the present invention to provide an improved AGC gate signal generating circuit.

It is a more specific object of the invention to provide an improved AGC gate signal generating circuit which is relatively inexpensive to manufacture yet provides satisfactory performance for both nominal and reduced level video signals.

BRIEF DESCRIPTION OF THE DRAWINGS

The features of this invention which are believed to be novel are set forth with particularity in the appended claims. The invention, together with its object and the advantages thereof, may best be understood by reference to the following description taken in conjunction with the accompanying drawings in which:

DESCRIPTION OF THE PREFERRED EMBODIMENT

Figure 1:
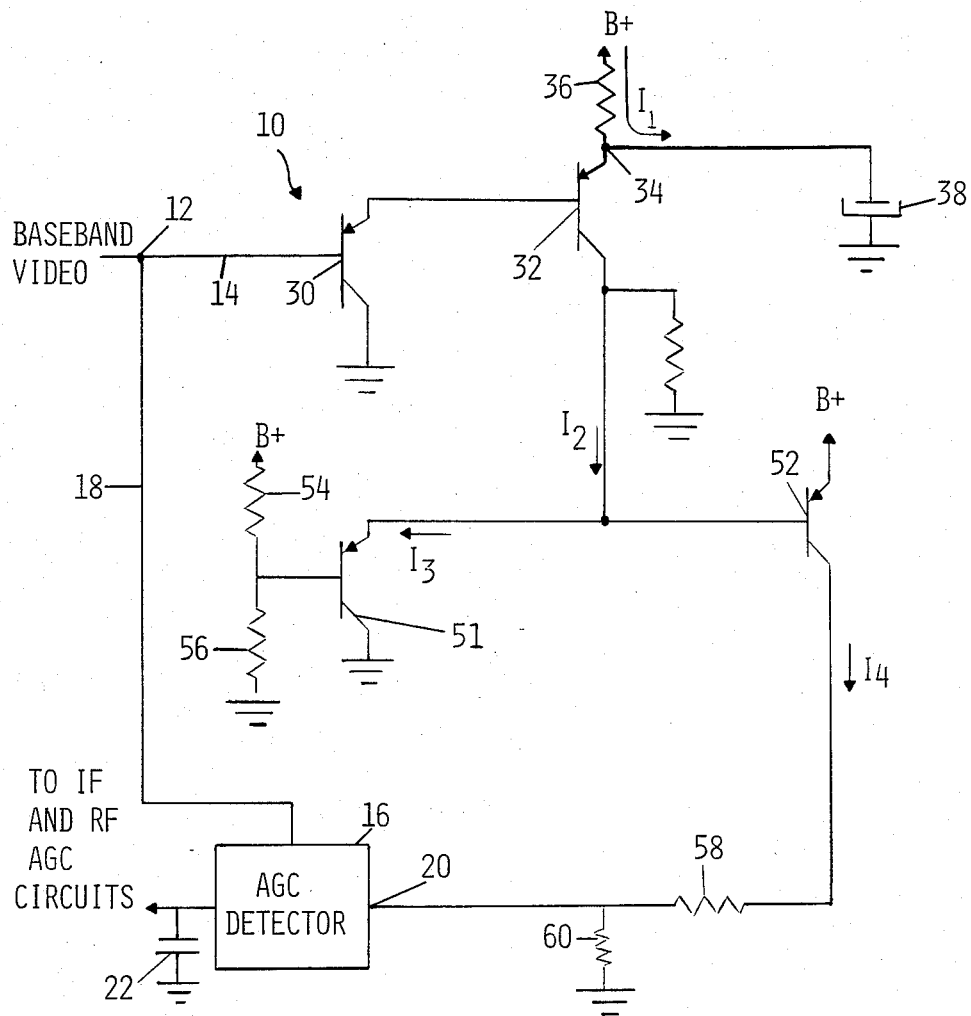
FIG. 1 is a schematic diagram showing the AGC gate signal generating circuit of the invention.

Referring to the drawings, FIG. 1 schematically shows an AGC gate signal generating circuit 10 in accordance with a preferred embodiment of the present invention. The AGC gate signal generating circuit 10 is adapted for operation in conjunction with a conventional television receiver gated AGC system.

A composite baseband video signal is coupled from the television receiver's video detector (not shown) to an input terminal 12 and therefrom to the input of the AGC gate signal generating circuit 10 via a conductor 14 as well as to an input of a conventional AGC detector 16 via a conductor 18. As is well known in the art, the AGC detector 16 is responsive to a gating signal at an input 20 for sampling the video signal supplied by conductor 18 and for storing the sampled signal level across a capacitor 22. The gating signal supplied to input 20 of the AGC detector 16 is ideally developed in time coincidence with the horizontal sync pulses of the received video signal so that the signal level stored across capacitor 22 reflects the sync tip levels thereof. As is further well known in the art, the AGC voltage stored across capacitor 22 is normally provided as a control voltage to the RF and IF amplifier stages of the receiver to effect a variation in the gain of these stages inversely in accordance with the sync tip levels of the video signal to provide a constant peak amplitude composite video signal. As described in further detail below, the present invention relates to a novel circuit for providing an appropriate gate signal to input 20 of the AGC detector 16.

More specifically, the AGC gate signal generating circuit 10 of the invention comprises an input emitter-follower transistor 30 for coupling the video signal from input terminal 12 to the base of a PNP transistor 32. The emitter of transistor 32 is connected to a node 34 formed between a series connected resistor 36 and capacitor 38. The other end of resistor 36 is connected to a source of positive supply potential B+ and the other end of capacitor 38 is connected to ground potential. As will be explained in further detail below, the time constant characterizing the series RC circuit comprising resistor 36 and capacitor 38 is selected such that a charging current $I_1$ may be developed therein for charging the capacitor at a relatively slow rate in relation to a horizontal scanning line of the video signal and at a relatively fast rate in relation to a field of the video signal. The time constant is additionally selected for preventing the capacitor from charging to a level above the video black level during any particular horizontal line. In a working implementation of the invention, B+ was selected to have a value of 12 volts, resistor 36 a resistance of 10K ohms and capacitor 38 a capacitance of 0.47 microfarads.

Figure 2A:
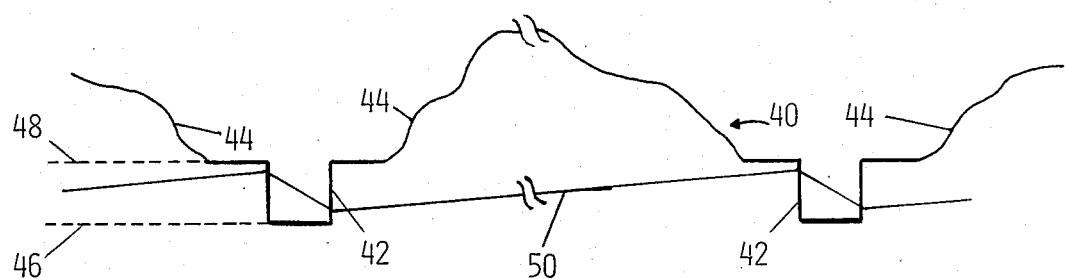
FIGS. 2A, 2B and 2C are signal waveforms illustrating the operation of the AGC gate signal generating circuit of FIG. 1.

Referring now to FIG. 2A, there is shown several lines of a composite baseband video signal 40. Video signal 40 is composed of a plurality of horizontal sync pulses 42 occurring at a line repetition rate of about 15.75 KHz and separated from each other by a respective plurality of horizontal scanning lines 44 of baseband video information. In a nominal condition, each horizontal sync pulse extends between a sync tip level 46 of about 4 volts and a video black level 48 of about 4.8 volts. Under reduced signal level conditions, the video signal 40 is shifted in an upwardly direction so that corresponding points thereof reflect more positive voltage levels.

Figure 2B:

The voltage developed across capacitor 38 of the AGC gate signal generating circuit 10 in response to a nominal level video signal is depicted by waveform 50 in FIG. 2A. This signal is developed as follows. During each horizontal scanning line 44 of the video signal 40 a relatively high video level signal is supplied to the base of the transistor 32 maintaining it in a non-conductive state. In thisstate, charging current $I_1$ flows through the RC circuit slowly charging the capacitor between adjacent sync pulses to a level below the video black level as shown. During the occurence of a horizontal sync pulse 42, the relatively lower video level signal coupled to the base of the transitor 32 allows it to begin conducting whereby the capacitor 32 discharges through the emitter-collector circuit of the transistor 32 producing a collector current pulse $I_2$ as shown in FIG. 2B. This charging and discharging of capacitor 38 continues in response to successive horizontal scanning lines 44 and horizontal sync pulses 42 so that a successive series of collector current pulses $I_2$ are produced in time coincidence with the horizontal sync pulses 42. After some additional signal processing to be described hereinafter, the collector current pulses $I_2$ are used to form the AGC gating signal supplied to input 20 of the AGC detector 16.

It will be appreciated that charging the capacitor 38 at a relatively slow rate during each horizontal scanning line 44 is necessary to maintain the voltage developed across the capacitor at a level below the black level 48 of the video signal. Were the voltage developed across capaitor 38 to exceed the video black level during a horizontal scanning line—in particular, to a level exceeding the instantaneous video level, transistor 32 could be rendered conductive producing an erroneous collector current pulse $I_2$ and thereby an erroneous AGC gating signal. For this reason, the time constant of the RC circuit comprising resistor 36 and capacitor 38 is selected to develop the charging current $I_1$ at a relatively slow rate in relation to a horizontal scanning line.

While the aforementioned time constant is preferably selected for producing a charging current $I_1$ at a relatively slow rate in relation to a horizontal scanning line as explained above, it is also desirable that, at the same time, the time constant effect the charging current $I_1$ at a relatively fast rate in relation to a field of the video signal. It will be appreciated that the latter feature is desirable in order to insure that an AGC gate signal is generated within a reasonable time in response to a reduced level video signal.

More specifically, a reduced level video signal will result in an upwards shift of video waveform 40 of FIG. 2A to more positive voltage levels. As a consequence, an increased positive voltage is required at the emitter of transistor 32 to render the transistor conductive for producing a collector current $I_2$ and thereby the AGC gate signal. This increased emitter voltage is derived across the capacitor 38 according to the invention by selecting the time constant characterizing the RC circuit comprising resistor 36 and capacitor 38 such that the positive-going slope of the charging waveform 50 will reach a positive value exceeding the level of the reduced level video signal within about 10–20 horizontal scanning lines or about one millisecond. In other words, the time constant is selected for realizing a charging current $I_1$ at a relatively fast rate in relation to a field of the video siganl to insure that an AGC gate signal is developed within a relatively short time (e.g. about one millisecond) in response to a reduced level video signal.

Figure 2C:
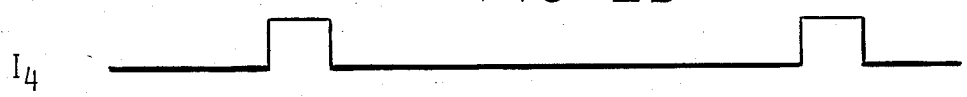

Returning to FIG. 1, the collector current pulses $I_2$ (see FIG. 2B) are coupled to the emitter of a clamp transistor 51 as well as to the base of an emitter-follower transistor 52. Clamp transistor 51 is biased by a voltage divider comprising resistors 54 and 56 for developing an emitter-collector current $I_3$ for clamping the current pulses $I_4$ flowing through the emitter-follower transistor 52 to a constant level for all video signal levels as illustrated in FIG. 2C. The constant level current pulses $I_4$ are then coupled through a pair of resistors 58 and 60 for developing the AGC gate signal applied to the input 20 of AGC detector 16.

What has thus been shown is an improved AGC gate signal generating circuit which may be described as "self-gating" in that the gate signal is derived dierctly from the detected video signal. The circuit operates for producing a constant level AGC gate signal in response to each horizontal sync pulse of a nominal level video signal and for producing an AGC gate signal within a relatively short sub-field interval in response to a reduced level video signal.

While a particular embodiment of the invention has been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. In a television receiver developing a video signal, an improved AGC gate signal generating circuit comprising:
    a source of supply potential;
    a resistor-capacitor circuit coupled to the source of supply potential and characterized by a time constant enabling the development of a capacitor charging current at a relatively slow rate in relation to a horizontal scanning line of the video signal and at a relatively fast rate in relation to a field of the video signal; and
    switch means having first and second control inputs coupled for receiving the video signal and the capacitor charge respectively, the switch means being responsive to a nominal level video signal for assuming a non-conductive state during each horizontal scanning line thereof permitting development of the capacitor charging current and assuming a conductive state during each horizontal sync interval thereof for discharging the capacitor for developing said AGC gate signal, the switch means further assuming a conductive state for discharging the capacitor for developing said AGC gate signal in response to a number of horizontal scanning lines of a reduced level video signal substantially less than a full field.

2. An improved AGC gate signal generating circuit according to claim 1 wherein the time constant of the resistor-capacitor circuit is characterized such that the capacitor charging current is effective for charging the capacitor to a level below the video black level during each horizontal scanning line of a nominal level video signal.

3. An improved AGC gate signal generating circuit according to claim 2 including current clamp means for clamping the AGC gate signal to a constant level.

4. An improved AGC signal generating circuit according to claim 2 wherein the resistor-capacitor circuit comprises a series connected resistor and capacitor and wherein the switch means comprises a first transistor having a base terminal coupled for receiving the video signal, an emitter terminal coupled to the node formed between the resistor and capacitor and a collector terminal for developing the AGC gate signal.

5. An improved AGC gate signal generating circuit according to claim 4 including a second transistor coupled to the collector of the first transistor for clamping the AGC gate signal to a constant level.

6. In a television receiver developing a video signal, an improved AGC gate signal generating circuit comprising:
a source of supply potential;
a series resistor-capacitor circuit coupled to the source of supply potential and characterized by a time constant enabling the development of a capacitor charging current at a relatively slow rate in relation to a horizontal scanning line of the video signal and at a relatively fast rate in relation to a field of the video signal; and
transistor means having a base terminal coupled for receiving the video signal, an emitter terminal coupled to the node formed between the resistor and capacitor and a collector terminal, the transistor means being responsive to a nominal level video signal for assuming a non-conductive state during each horizontal scanning line thereof permitting development of the capacitor charging current for charging the capacitor to a level below the video black level and assuming a conductive state during each horizontal sync interval thereof for discharging the capacitor to produce a collector current comprising said AGC gate signal, the transistor means further assuming a conductive state for discharging the capacitor to produce a collector current comprising said AGC gate signal in response to a number of horizontal scanning lines of a reduced level video signal substantially less than a full field.

7. An improved AGC gate signal generating circuit according to claim 6 including a second transistor coupled to the collector of the transistor means for clamping the collector current comprising said AGC gate signal to a constant level.

* * * * *